US009435490B2

(12) United States Patent
Galas et al.

(10) Patent No.: US 9,435,490 B2
(45) Date of Patent: Sep. 6, 2016

(54) SEMIPERMANENTLY CLOSED MICROFLUIDIC VALVE

(75) Inventors: Jean-Christophe Galas, Montreal (CA); Emmanuel Roy, Montreal (CA); Teodor Veres, Montreal (CA)

(73) Assignee: National Research Council of Canada, Ottawa, Ontario (CA)

( * ) Notice: Subject to any disclaimer, the term of this patent is extended or adjusted under 35 U.S.C. 154(b) by 764 days.

(21) Appl. No.: 13/643,426

(22) PCT Filed: Apr. 26, 2010

(86) PCT No.: PCT/CA2010/000636
§ 371 (c)(1),
(2), (4) Date: Feb. 25, 2013

(87) PCT Pub. No.: WO2011/134038
PCT Pub. Date: Nov. 3, 2011

(65) Prior Publication Data
US 2013/0139899 A1    Jun. 6, 2013

(51) Int. Cl.
*F17D 1/00*      (2006.01)
*B01L 3/00*      (2006.01)
*F16K 99/00*     (2006.01)

(52) U.S. Cl.
CPC ........... *F17D 1/00* (2013.01); *B01L 3/502738* (2013.01); *F16K 99/0026* (2013.01); *F16K 99/0059* (2013.01); *B01L 2400/0661* (2013.01); *Y10T 137/0379* (2015.04); *Y10T 137/7737* (2015.04)

(58) Field of Classification Search
CPC .. F17D 1/00; F16K 99/0026; F16K 99/0059; B01L 3/502738; B01L 2400/0661
USPC ............................. 137/825–832; 251/11, 368
See application file for complete search history.

(56) References Cited

U.S. PATENT DOCUMENTS

| | | | |
|---|---|---|---|
| 5,512,131 A | 4/1996 | Kumar et al. | |
| 6,408,878 B2 | 6/2002 | Unger et al. | |
| 6,808,522 B2 | 10/2004 | Richards et al. | |
| 6,929,030 B2 | 8/2005 | Unger et al. | |
| 6,935,617 B2 * | 8/2005 | Mead ................ | B01L 3/502738 251/331 |
| 7,198,759 B2 * | 4/2007 | Bryning ............ | B01L 3/502738 422/504 |
| 7,250,128 B2 | 7/2007 | Unger et al. | |
| 7,306,612 B1 | 12/2007 | Hansen et al. | |
| 2002/0168278 A1 | 11/2002 | Jeon et al. | |
| 2005/0072946 A1 | 4/2005 | Studer et al. | |
| 2005/0173468 A1 * | 8/2005 | Matsumoto ........ | B65D 47/2081 222/494 |
| 2011/0085949 A1 | 4/2011 | Roy et al. | |

FOREIGN PATENT DOCUMENTS

EP    1905514    4/2008

OTHER PUBLICATIONS

Sudarsan et al., "Thermoplastic Elastomer Gels: An Advanced Substrate for Microfluidic Chemical Analysis Systems", Anal. Chem., vol. 77, p. 5167-5173, 2005.

* cited by examiner

*Primary Examiner* — Kevin Murphy
*Assistant Examiner* — Nicole Wentlandt
(74) *Attorney, Agent, or Firm* — Jason E. J. Davis

(57) ABSTRACT

A microfluidic valve operable to semi-permanently close a channel of a microfluidic device defined between a thermoplastic elastomer (TPE) film and a substrate operates employs a surface contact bond between the TPE and a wall of the channel. Thermomechanical release of the valve, tristate functionality, and repeated semi-permanent closure and release are demonstrated.

20 Claims, 2 Drawing Sheets

Naturally closed valve,
after 8 hours under 25 Psi

Re-opened valve after 3
minutes, 110 deg. bake

SEMIPERMANENTLY CLOSED MICROFLUIDIC VALVE

CROSS-REFERENCE TO RELATED APPLICATIONS

This application is a national phase entry of International Patent Application PCT/CA2010/000636 filed Apr. 26, 2010, the entire contents of which is herein incorporated by reference.

FIELD OF THE INVENTION

The invention relates in general to microfluidic devices formed with at least one thermoplastic elastomer (TPE) film having a microfluidic channel defined at an interface between the TPE film and a substrate to which the TPE film is bonded; and, in particular, to a microfluidic valve in such a microfluidic device adapted to be semipermanently closed, that is, closed and retained closed under no persistent pressure applied on the membrane, by virtue of a contact bond between the membrane and the microfluidic channel, such as a tristate valve.

BACKGROUND OF THE INVENTION

Several designs of microfluidic valves exist for various microfluidic applications, such as single purpose, multipurpose, or general purpose Lab on Chip (LoC), microfluidic crystallization devices, sorting devices, arrayers, etc. Generally these devices provide an arrangement of channels defined between two meeting surfaces, such as formed within a layered microfluidic device.

To selectively close or open passages in such devices, it is known to use pneumatically controlled polymer valves obtained by multilayer soft lithography of (most commonly) polydimethylsiloxane (PDMS), for example. U.S. Pat. No. 6,929,030 to Unger teaches a method of fabricating an elastomeric structure, comprising: forming a first elastomeric layer on top of a first micromachined mold, the first micromachined mold having a first raised protrusion which forms a first recess extending along a bottom surface of the first elastomeric layer; forming a second elastomeric layer on top of a second micromachined mold, the second micromachined mold having a second raised protrusion which forms a second recess extending along a bottom surface of the second elastomeric layer; bonding the bottom surface of the second elastomeric layer onto a top surface of the first elastomeric layer such that a control channel forms in the second recess between the first and second elastomeric layers; and positioning the first elastomeric layer on top of a planar substrate such that a flow channel forms in the first recess between the first elastomeric layer and the planar substrate. According to Unger, nearly any elastomeric polymer is suitable, but the only examples given are fabricated from silicone rubber, specifically GE RTV 615 (formulation), a vinyl-silane cross-linked (type) silicone elastomer.

Unger teaches two parallel layers having transversely oriented channels, one for control and the other for fluid flow. Movement of the membrane separating the control and fluid flow channels (due to the control channel being pressurized or the membrane being otherwise actuated) cuts off flow passing through the fluid flow channel.

Other references on this subject are: A. P. Sudarsan, J. Wang and V. M. Ugaz, "Thermoplastic elastomer gels: an advanced substrate for microfluidic device construction", *Analytical Chemistry*, 77, 5167-5173, 2004; U.S. Pat. No. 6,408,878 to Unger et al.; US Patent Application publication number 2002/0168278 to Whitesides et al.; and U.S. Pat. No. 5,512,131 to Kumar et al. There are a wide range of useful high throughput testing facilities and microfluidic devices for feeding a solution to a variety of inputs, for sorting, mixing, filtering or selectively applying different treatments to one or more fluids to be analyzed, for crystallization, or for feeding optical (or other) interrogation instruments or reaction chambers. In many cases it is desirable to provide a limited volume of a reagent, cleaning solution, or other chemical species for selective reaction with a test sample, for example.

For example, U.S. Pat. No. 6,808,522 to Richards et al. teaches a method of producing a plurality of reservoirs in a hard silicon based chip for releasing the molecules stored therein. The method requires capping the reservoirs and release systems for the reservoirs for uncapping them when needed.

Applicant has filed a patent application Ser. No. 12/588,236 directed to the use of thermoplastic elastomers (TPEs) for use in microfluidic devices, TPEs having advantages over PDMS and other known materials in terms of bonding and patterning of layers for microfluidic devices.

There remains a need in the art for better systems for controlling flow within microfluidic devices, and in particular for providing a releasable reservoir.

SUMMARY OF THE INVENTION

Applicant has unexpectedly discovered that microfluidic valves can be provided having that have a tristate actuation: open, temporarily closed, and semipermanently closed. The semipermanently closed state is believed to be novel.

A microfluidic valve is provided comprising: a thermoplastic elastomer (TPE) film having first and second opposite surfaces; a substrate forming a seal with the first surface around a periphery of a channel defined between the substrate and TPE film, to define a region of the TPE film adjacent the channel that forms a membrane for the microfluidic valve; wherein a composition of the TPE film is chosen so that the valve can be in one of three states: open, with the membrane retracted from the channel to permit fluid flow through the channel; temporarily closed under a force applied on the membrane from the second surface to press the membrane into the channel to effectively limit flow across the channel; and semipermanently closed wherein a surface bond between the membrane and substrate keep the passage closed with no persistent force on the membrane opposite the channel, until re-opened with a thermal stimulation allowing for the de-bonding of the membrane.

Specifically, a microfluidic device is provided, the device comprising: a thermoplastic elastomer (TPE) film having first and second opposite surfaces; a substrate forming a seal with the first surface around a periphery of a channel defined between the substrate and TPE film; and a part of the TPE film defining a membrane having a first side defining part of the channel, and a second side mechanically actuable to close the channel, wherein compositions of the TPE film and the substrate are chosen to permit the membrane to be contact bonded to a channel wall if subjected to a first temperature and pressure regime, to semipermanently retain the channel closed under no persistent force on the second side of the membrane, until re-opened by a thermomechanical stimulus.

The compositions of the TPE film and substrate may be chosen to permit the membrane to be pressed into the channel to limit flow across the channel by application of a force applied on the second side to temporarily close the channel for the duration of the force, without semipermanently closing the channel.

A channel wall opposite the membrane may be stiffer than the TPE material. The substrate may be harder than the TPE film. The channel may be a closed chamber divided by the membrane when the channel is closed. The device may further comprise an actuator for selectively applying pressure on the second side of the membrane to close the channel, for example, the actuator may include a conduit formed, at least in part, at an interface between the second surface, and another layer of the microfluidic device. The TPE composition may comprise a tackifier to promote contact bonding of the membrane to the channel wall. The substrate may have a throughbore opposite the first side of the membrane that is blocked by actuation of the valve. The compositions of the TPE film and substrate may be chosen so that their respective Hildebrandt parameters differ by less than 10 $(J/cm^3)^{1/2}$ or 5 $(J/cm^3)^{1/2}$. The TPE composition may be a formulation containing:

- a thermoplastic rubber, a styrenic block polymer, a copolyester, a polyurethane, a polyolefin blend, a polyolefin alloy, a polyamide, an olefin vinyl polymer, an ethylene vinyl alcohol, or a derivative of one or more of the above;
- a natural rubber, an EVA, a SBR, a SIS, a SBS, an acrylates, or a derivative of one or more of the above, and a tackifier comprising a rosin, or a hydrogenated rosin;
- a SIS, a SEBS, or a derivative of one or more of the above, and a tackifier comprising a hydrocarbon resins, such as C5 aliphatic resins, C9 aromatic resins and C5/C9 aliphatic/aromatic resins; or
- hydrogenated block copolymers such as SIS, SEBS and SEPS or a polyolefin, and a tackifier comprising a Regalrez hydrogenated pure monomer hydrocarbon resin.

The device may further comprise a pressurized flow control channel separated from the channel only by the membrane for selectively closing the channel; two pressurized flow control channels at opposite sides of the channel in the neighbourhood of the valve; a pressurized flow control channel separated from the channel only by the membrane for selectively closing the channel, the membrane being parallel to the substrate; or a pressurized flow control channel separated from the channel only by the membrane for selectively closing the channel, the membrane being perpendicular to the substrate. The substrate may be formed of a rigid thermoplastic, such as PMMA, polycarbonate, or polystyrene.

A method for semi-permanently closing a channel in a microfluidic device is provided. The channel is defined at an interface between a substrate and a TPE film, the TPE film is chosen to provide surface bonding to itself and the substrate. The method comprises: applying pressure to a wall of the TPE film adjacent to the channel to deflect the wall of the TPE film, closing the channel, and maintaining this pressure for a prescribed duration, until the surface bond is formed to semi-permanently close the channel. The semipermanently closed channel may be adapted to be opened by a thermomechanical stimulus. The prescribed duration may be less than 8 hours, more preferably less than 3 hours, more preferably less than 1 hour, more preferably less than 30 minutes, more preferably less than 10 minutes, more preferably less than 3 minutes.

A method is also provided for opening a semipermanently closed channel in a microfluidic device, the method comprising applying a thermomechanical stimulus to a region in the neighbourhood of the closed channel to selectively open the channel, by releasing a surface contact bond between a TPE membrane and a wall of the channel. The microfluidic device may further comprise an actuation means for applying pressure to the channel, permitting the microfluidic channel to be closed again.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

In accordance with the present invention a valve for a microfluidic device is provided, that is capable of semi-permanent closure, by virtue of surface bonding between a membrane and a channel, that remains closed until a thermal stimulus reopens the channel. Herein a microfluidic device refers to substantially any device that has a network of channels, reservoirs, chambers, input and output ports etc., where the channels have flow cross-sections smaller than 1 $mm^2$, and therefore includes nanofluidic devices.

Figure 1:
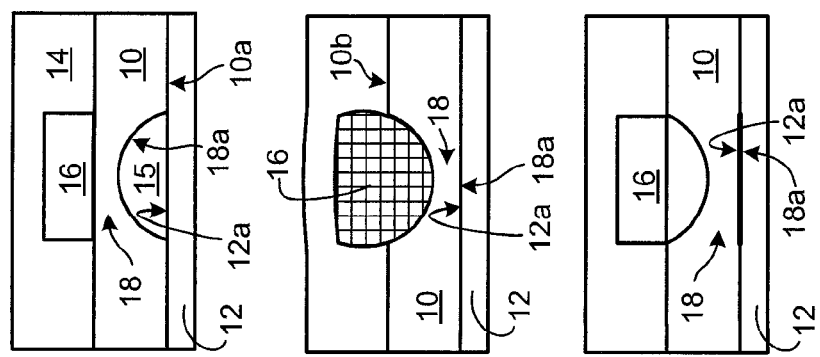
FIG. 1 is a schematic illustration of a 3-layer microfluidic device having a tristate valve, wherein a control channel lies between a channel and a substrate.

FIG. 1 consists of 3 schematic illustrations of a microfluidic valve in a 3-layer microfluidic device in each of 3 respective states. The device has a thermoplastic elastomer (TPE) film 10 having a first surface 10*a* for meeting a substrate 12, and a second surface 10*b* (opposite the first surface 10*a*) for meeting a control channel layer 14. While the control channel layer 14 is optional, and other means can be used to actuate the valve (manual or automated mechanical actuators, such as piezoelectric actuators, thermally actuated materials, shape memory alloys, or other solid parts, preferably smaller than the valve, subject to controlled motion to contact the second surface 10*b* opposite a channel 15). Channel 15 is defined between the TPE film 10 and substrate 12, by a sealed meeting of the first surface 10*a* with the substrate 12 along a periphery of the channel 15. The channel 15 is enclosed by part 18*a* of the first surface 10*a* and a meeting surface 12*a* of the substrate 12. Similarly the second surface 10*b* and layer 14, as shown, includes a control channel 16. A membrane 18 is defined by a part of the TPE film 10 that extends between the first surface 10*a*

(18a) and second surface 10b, more specifically between the channel 15 and control channel layer 14.

A cross-section of both control channel 16 and channel 15 may have dimensions in the following intervals (width: 1-2000 µm, height: 5-500 µm), although smaller or larger channels can be produced with these forming techniques. Channel dimensions are generally limited only by the molds and dimensions of the patterned structures, when formed of TPE. The thickness of the TPE film 10, or of the membrane 18 may range from 1 to 200 µm, may depend on a size of the flow channel, deformability of the membrane material, a ratio of (mean) cross-sectional area to perimeter of the channel 15, an operating thermodynamic regime of the microfluidic valve, a surface affinity of the membrane with respect to the channel walls, and a pressure the valve is expected to bear.

While the control channel is shown formed in the control channel layer 14, and the channel 15 is provided in the TPE film 10, although this is by no means necessary. Applicant has developed low-cost, high resolution forming techniques disclosed in Applicant's corresponding U.S. patent application Ser. Number 12/588,236 that can pattern TPE film 10, with low temperature and pressure requirements, using SU8 molds, and thus a TPE film 10 having patterned channel 15 and control channel 16 is particularly preferred. Patterning on both sides can be performed by patterning one side at a time, or by patterning both sides concurrently. If the TPE film 10 is softer than the substrate 12 and control channel layer 14, it is easier to align top and bottom surface molds than to align a readily deformable TPE film 10 with the control channel layer 14, and where a number of valves are to be arranged, this can be more difficult still. Perhaps an easiest to assemble arrangement uses patterned hard thermoplastic substrate 12 and control channel layer 14 both of which being patterned, as it is easier to align these relatively hard bodies, and place the TPE film between them. The form of the channel 15 may be curved, as shown in FIG. 1, which has advantages for closing the channel 15 (as seen in the 2nd and 3rd states) with minimal deformation of the membrane 18, but could have a wide variety of other contoured walls in flexed and unflexed states.

In operation, the valve of the top figure is open, and fluid may communicate through channel 15. While the open state may be effected by providing a negative pressure in the control channel, in the present embodiment, neutral (atmospheric) pressure suffices to retain the valve in the open state.

The control channel layer 14 is shown having a softness greater than substrate 12, as can be seen in the second image, wherein the valve is in a temporarily closed state, or wherein the valve is being actuated to become semipermanently closed by pressing the membrane 18 into the channel 15, with application of a higher than ambient pressure fluid, and may be pneumatic, hydraulic, or use a compressible or incompressible fluid other than water in the control channel 16. It is noted that control channel layer 14 flexes and that while the control channel 16 is enlarged in all directions, because the membrane 18 is a thinnest wall of the control channel 16, it deforms to a greatest degree, and presses the membrane 18 against the meeting surface 12a.

The TPE composition is chosen to give surface properties to the membrane that permit the membrane to be semipermanently closed, that is, the membrane 18 is designed to form a contact bond with the rest of the channel 15 that is sufficient to retain the membrane 18 in place, without persistent applied pressure. To achieve this state, a variety of thermodynamic (pressure and temperature) regimes may be required, depending on the specific TPE composition as well as that of the substrate. The regime may also vary with a size and shape of the channel 15, and a pressure load retained within the channel 15.

In some embodiments the TPE composition is chosen for semipermanent closure in the shortest time and with the least pressure within the limits of the control of fluid pressure in the control channel 16. In such embodiments the valve may be incapable of temporary closure, which may be acceptable for some uses, for example where extended storage times are foreseen and relatively slow opening times are desired. In other embodiments surface bonding to effect semi-permanent closures is performed by applying pressure sufficient to temporarily close the valve for a period of time that is greater than an expected duration of the closure of the valve (for the procedures the microfluidic device is designed for). In still other embodiments, this pressure may be insufficient to semipermanently close the valve unless held for a very long duration (e.g. one or more days), and a pressure substantially greater than the pressure for temporary closure may be required to semi-permanently close the valve. The latter two cases result in tristate valves.

The TPE film 10 is composed of a formulation including a TPE polymer, such as: a thermoplastic rubber (e.g. TPR), a styrenic block polymer (e.g. SBS, SEPS, SEBS, SIBS), a copolyester (e.g. COPE), a polyurethane (e.g. TPU), a polyolefin blends (e.g. TPO), a polyolefin alloy (e.g. TPV), a polyamides (e.g. PEBA), an olefin vinyl polymers (e.g. EVA), an ethylene vinyl alcohol (e.g. EVOH), or a derivative or combination of any one or more of the above. The formulation may include numerous additives, fillers and/or compounds for processing, clarifying, colouring or otherwise embuing the TPE film 10 with desired properties, including optical or thermal properties. Importantly the formulation provides surface adherence to permit contact bonding of the material, as well as bulk properties for elastically restoring the TPE film 10 principally containing one or more of the above, for release of the semi-permanent closure, if the contact bond is released.

The channel 15 is walled by the TPE film 10 (including membrane 18), as well as substrate 12. The selection of the TPE film 10 is chosen to cooperate with the surface properties of the substrate 12. This surface can be made either of soft TPE materials (see the list above), or a rigid thermoplastic material, such as poly(methyl-methacrylate), poly (cyclo-olefin), polycarbonate, or polystyrene. The selection of the substrate 12 TPE film 10 pair is crucial in order to ensure a good bonding/releasing capabilities of the valve, although, to a lesser degree, the size and dimensions of the channel 15 and membrane 18 can be important. For example, it will be noted that the greater the surface area of the interface between membrane 18 and 12a, the less bonding strength is required to retain the channel closed, and the more easily the flow is stopped.

The Hildebrandt solubility parameters of both materials provide an important indicator as to whether one can expect desired bonding and release. This parameter, describes the capability of polymer materials dissolve in each other, allowing a cohesive contact bond over a desired operating temperature range. To ensure an efficient bonding of the valve, we estimated that the difference of the Hildebrandt parameters needs to be below 5-10 $(J/cm^3)^{1/2}$.

The above listed TPE formulations might contain up to 50 wt. % of a tackifier or oil in order to improve or reduce the adhesion of the membrane 18 to the opposing channel walls. Examples of tackifiers are: (i) Rosins and hydrogenated rosins : they are ideal to bring adhesion to almost all polymer types, including, natural rubber, EVA, SBR, SIS, SBS and acrylates; (ii) Hydrocarbon resins including CS aliphatic resins, C9 aromatic resins and C5/C9 aliphatic/aromatic resins : they are ideal for tackifying SIS and SEBS block copolymers, and additionally improve transparency and stability of such blends; (iii) Regalrez hydrogenated pure monomer hydrocarbon resins : they are exceptionally good tackifiers for hydrogenated block copolymers such as SIS, SEBS and SEPS and are highly compatible with polyolefins, and additionally impart high clarity and UV resistance to the TPE.

By selection of the TPE formulation and the properties of the channel, semi-permanent closure of the channel may be performed within 24 hours of applied pressure or less, and reopening can be performed substantially instantaneously. If heat is used to assist semi-permanent closure, it is important that the temperature does not effectively re-mold the polymer.

Reopening the valve in the semi-permanently closed state may involve applying a thermal regime similar or dissimilar to that used to semi-permanently close the valve. Negative pressure may be applied in the control channel 16, and/or increased pressure may be applied within the channel 15, to assist in the reopening, however Applicant has not found this to be necessary when using the specific compositions described below. The thermal response of the material alone has been shown to re-open the valve.

The control channel layer 14 may be made of silicon, glass, PDMS, rigid thermoplastics and even soft TPE material. Advantageously, if the control channel layer 14 is of similar composition as the substrate 12, the valve may be reversible and the channel 15 and control channel 16 may be reversed, depending on the desired operating regime, and the desired process the microfluidic device is designed to provide.

It should be noted that while it has been found useful to provide a substrate 12 with a relatively hard surface for resistance against the bearing force on the membrane 18, it has been found that a device made entirely of the same TPE composition in 2 or 3 layers is still effective in that the membrane, by virtue of its thinness, moves substantially more than any of the other walls of the same composition, under pressure from the control channel. The manner in which the bond is made differs somewhat, but the operation is effectively the same.

Figure 2:
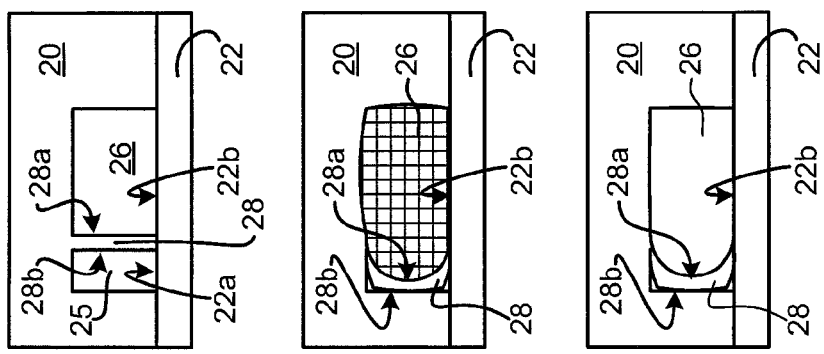
FIG. 2 is a schematic illustration of a 2-layer microfluidic device having a tristate valve with a control channel in a common plane with the channel.

FIG. 2 is a schematic illustration of bi-layer microfluidic valve in a microfluidic device in accordance with an embodiment of the invention. This embodiment is similar to FIG. 1 except that there is no control channel layer 14, as a control channel 26 is provided within a TPE film 20 adjacent a channel 25. Corresponding features of FIG. 1 and FIG. 2 differ systematically by 10, and descriptions of each element are not repeated, except to note the principal differences. TPE film 20 contains both control channel 26 and channel 25, and it is made of the TPE. The embodiment of FIG. 2 involves applying the force on a membrane 28 between the control channel 26 and channel 25, from a direction perpendicular to a normal of substrate 22 (in FIG. 1 the force was applied parallel to the normal of the substrate 12), and avoids the requirement for a separate control channel layer. As such the substrate 22 meets both the channel 25, at a part 22a, and control channel 26, at a part 22b. A first side 28a of the membrane 28, in contact with control channel 26, presses on the membrane 28, and a second side 28b of the membrane 28 presses against an opposite wall of the channel 25, although part of 28b also meets the part 22a). Top, middle and bottom figures show the valve respectively in the open state, temporarily closed, or closing state, and semi-permanently closed state. The substrate 22 is again made of a hard thermoplastic material, as it does not deflect under the pressure shown in the middle figure.

It will be appreciated by those of skill in the art that a plate may be inserted into the channel 25 along a wall opposite wall 28b, or in a neighbourhood of the wall to stiffen the wall and encourage meeting of the membrane wall 28b. Alternatively, the wall opposite 28b may be a second membrane backed by a second control channel to effectively squeeze the channel 25 on both sides. The second control channel could be provided pneumatically connected with the control channel 26, or isolated therefrom for independent control of both sides of the channel 25.

Figure 3:
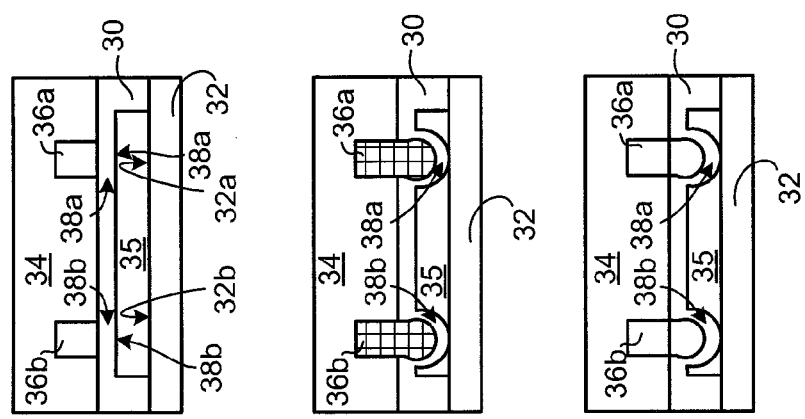
FIG. 3 is a schematic illustration of a 3-layer microfluidic device having two tristate valves in a common channel.

FIG. 3 is a schematic illustration of a three-layer microfluidic valve in a microfluidic device having two control channel s 36a,b and membranes 38a,b within a same channel 35, which is in the form of a reservoir or chamber. Accordingly channel 35 may be divided by regions defined by parts 32a,b of the substrate 32 that contact the membrane (when closed). Features of FIG. 1 correspond with those of FIG. 3 that have reference numerals with a difference of 20, and are described as far as different from FIG. 1. The channel 35 may have exits or, the divided volume of the channel 35 may provide for storage of a material that can be released into a remainder of the channel 35 by release of the respective valve. It will be appreciated that storage of reaction, catalyst, medium, clem1ing, or other materials within the microfluidic device is one natural application of devices including semipermanently closable valves according to the present invention. It will be noted that the actuation of the membrane may produce a balloon-like expansion of the membrane material that expands uniformly within the channel 35, and that a shape of this expansion may be controlled by careful control of the thickness of the membranes 38 and orientation of the membranes 38.

Figure 4:
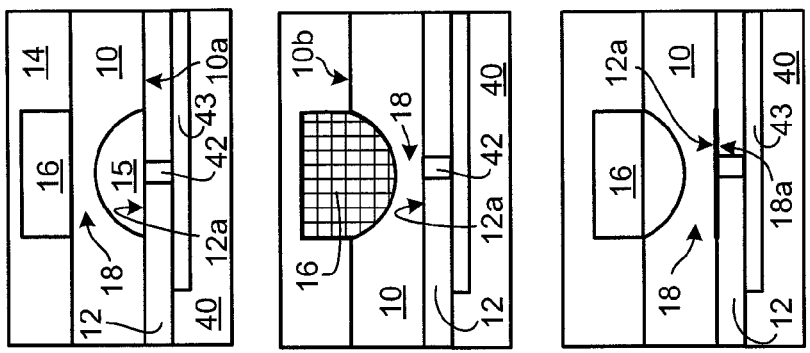
FIG. 4 is a schematic illustration of a 4-layer microfluidic device having a via that is effectively sealed by operation of a tristate valve.

FIG. 4 is a schematic illustration of four-layer valve in a microfluidic system. The system essentially includes the embodiment of FIG. 1, in which a throughbore 42 is provided in the rigid substrate 12, and the control channel layer 14 is shown as also rigid. The valve is a stop valve for the throughbore 42. While a second microfluidic layer 40 is shown, it is optional, as the throughbore 42 could be a port for controlled injection of material, using a device that produces a sealed connection to the rigid substrate 12. The second microfluidic layer 40 is shown having a microfluidic channel 43 in fluid communication with the throughbore 42. The valve as actuated (shown in the middle figure) bears on an annular surface surrounding the throughbore 42, although it could be designed to bear on a cylindrical inner surface of the throughbore 42, and the throughbore could have a variety of designs. The optional layer 40 is preferably a TPE layer for ready bonding to the rigid substrate 12, and is shown having a microfluidic channel in fluid communication with the throughbore 42. The alternation of TPE and hard thermoplastic layers permits the design of multilayer microfluidic devices.

The TPE and substrate layers may be fabricated using various techniques. Layers can be processed with thermoforming methods including (i) hot embossing (ii) injection-compression molding and (iii) IR thermoforming. Additionally, the TPE microchannels can be fabricated with a spin coating process, in which case the raw material is dissolved with an appropriate solvent and then spin coated on a microstructured mould containing the features to be replicated. Spin coating can produce very thin membranes with very high thickness control.

For assembling a multi-layer system, preferably a the top part (containing control channel) is placed and aligned versus the bottom one (microfluidic channel). Bonding of the different layers together might be achieved via different approaches i) thermal bonding: where all the stack is pre-assembling and then heating in an oven in order to ensure diffusion/intermixing of polymers chains at the interface. At this stage, the dealing with TPE/TP interfaces material offers tremendous advantages, because no force (applied force (other than atmospheric pressure or gravity)) is required in order to keep all the interfaces in contact. Typically, thermal bonding is achieved inside the followings temperature ranges: 60-120° C. for 5-120 minutes. The second approach deals with room temperature bonding of the layers. Here, each layers are pre-assembling and the stack is kept at room temperate for a period of 2 to 200 hours. The ability to achieve enhanced bonding is related to the appropriate material selection regarding the Hildebrandt parameters criterion described above (as well as oil/tackifier content (discussed above) and in our previous application). If the valve is composed of TPE SEBS G1657, and the substrate is composed of 1060R Zeonor poly(cyclo-olefin), the bonding is effective at room temperature for 12 hours. It is expected that addition of heat or pressure may decrease the bonding time.

EXAMPLES

The following commercially available TPE grades: Versaflex CL30 (GLS Corp), MD6945 and G1657 polymers (Kraton polymers, Houston, Tex., USA) have been used as received. Each of these is a SEBS polymer blend of unknown specific composition, possibly containing a tackifier. As commercially available polymer blends rarely provide complete composition information, it is difficult to determine what quantities of tackifier are required to operate for given cross-section perimeter/surface area ratio channels, pressure of the retained fluid and thermodynamic regime of the microfluidic device. All commercially available grades of SEBS and SIBS that were tried worked, or demonstrated properties that indicated that they would work. Table 1 lists relevant characteristics of these SEBS formulations.

TABLE 1

Properties of SEBS materials

| Properties | Material Grade | | |
|---|---|---|---|
| | VCL30 | MD6945 | G1657 |
| Tensile Modulus (MPa) | 1.1 | 1.6 | 3.45 |
| Break Elongation (%) | 760 | Unknown | 750 |
| Durometer Hardness. (Shore) | 30A | 35 | 47 |
| SEBS Diblocks (%) | nil | nil | 29 |
| SEBS Triblocks (%) | nil | 100 | 71 |
| Oil/Tackifier (%) | <5 | 0 | 0 |
| Styrene (%) | nil | 11.2-14.0 | 12.3-14.3 |

Patterned films of these materials were produced using spin casting of dissolved polymer blends, hot embossing, and pressure-free molding of films. Details of these experiments are presented in Applicant's co-pending U.S. patent application Ser. No. 12/588,236, the contents of which are incorporated herein by reference. In the spin casting examples, the polymer is dissolved with an appropriate solvent (e.g. toluene, chlorobenzene, hexane) and then spin coated on a microstructured mold containing the features to be replicated. The spin-cast examples have excellent thickness uniformity which permits membranes between the control and flow channels to be highly regular: the uncertainty of this thickness for these membranes is less than +/−2%. The flexibility of the TPE polymers facilitates demoulding of these channels.

Regarding the criteria of Hildebrand parameters, we have observed that bonding of the valve works if the difference between solubility parameters is less than 10 $(J/cm^3)^{1/2}$, and preferably less than 5 $(J/cm^3)^{1/2}$. If the TPE film is composed of TPE SEBS G1657, with a substrate corresponding to 1060R Zeonor poly(cyclo-olefin), substantially irreversible, water-tight bonding is provided at room temperature and pressure by providing contact for 8 hours (solubility parameters are respectively 17.7 and 19-20 $(J/cm^3)^{1/2}$ for PCO and SEBS materials). In addition, we know that for other material combinations: TPE film of CL30 SEBS with a substrate of polyethersulfone thermoplastic (Ajedium Films), which in that case provides a difference of 8 in term of Hildebrand parameters we are unable to bond the valve.

TPE films of MD6945, G1657 and CL30, 200 µm thick were obtained by thin film extrusion in a conventional manner. These films were placed between unpatterned silicon wafers that had been treated with trichloro-silane to reduce adhesion of the films to the wafers. The films were embossed at 140° C. is applied for 5 minutes under 4000 N homogeneous pressure in a vacuum chamber ($10^{-2}$ mbar). The final membrane thicknesses of the produced films were from 2-30 µm, controlled using a spacer in the range of 50-100 µm between the wafers. The uncertainty of this thickness for these membranes is +1-10%.

Figure 6:
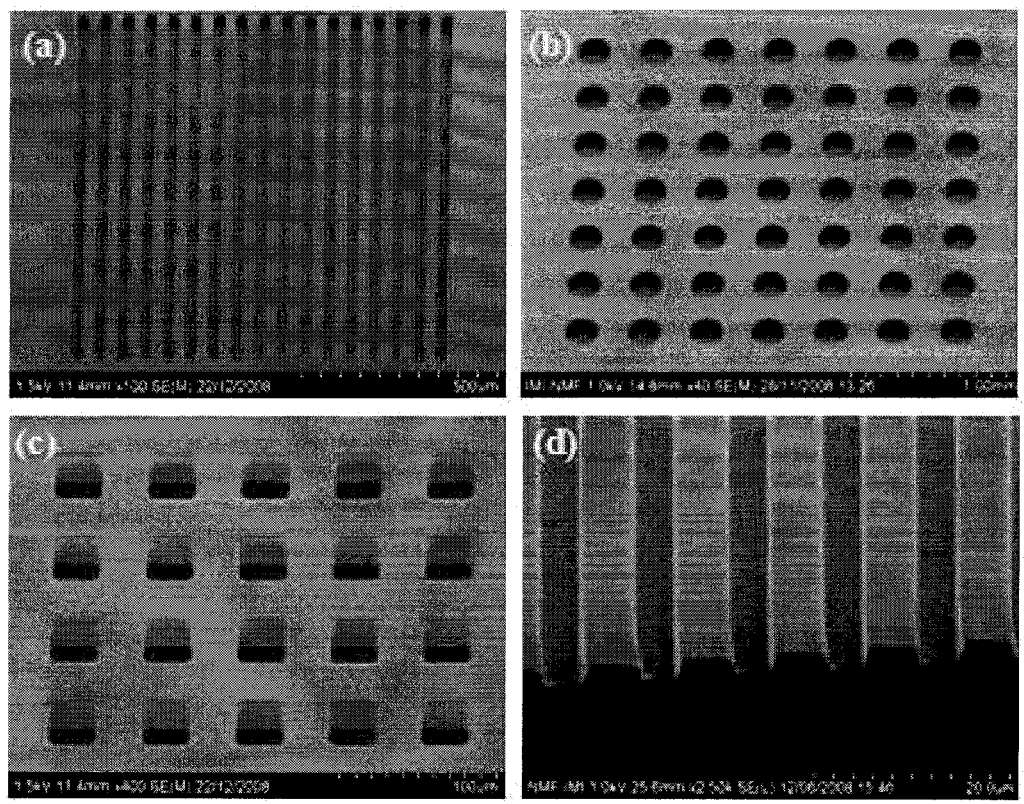
FIG. 6 are images of four patterned TPE layers of respective SEBS compositions produced by embossing under various temperature and pressure conditions.

To make a TPE control channel (like layer 14 in FIG. 1) a thick layer of the TPE material was structured over a trichloro-silane-treated 30 µm SU8 resist mold. A 5 mm TPE thick film is embossed, in order to finally obtain a 2 or 3 mm thick control layer with embedded channels (500-20 µm wide, by 10-200 µm deep). Applied temperature and pressure depended on the embossed polymer: G1657, due to its higher Young's modulus, required 2000 N at 100° C. for 10 minutes (25 minutes cycle process) while MD6945 required 1000N at the same temperature and cycle process. The lower Young's modulus of CL30 offers a significant improvement in the ease of thermoforming, as it can be embossed in 3 minutes at 165° C. under its own weight. FIG. 6, displays scanning electron micrographs of 3 different micro-patterned TPE materials (CL30, G1657, and MD6945 grades). Specifically, (A) is composed of G1657, (B) of MD6945, and (C and D) of CL30.

While in the present embodiment the control layer is thicker, to encourage deformation in a direction of the flow channel layer, it will be appreciated that relatively inflexible supporting layers above and/or below the control and flow layers could equally ensure such focusing of the pressure of the control channels.

Using this thermoforming technique, cross-sections of both control and flow channels can be made having dimensions within the following intervals: width 1 . . . 2000 µm, height 5 . . . 500 µm. Thicknesses of the deformable membranes ranged from 1 to 200 µm. Other techniques, such as spin coating, can provide thinner membrane and film thicknesses.

Figure 5A:
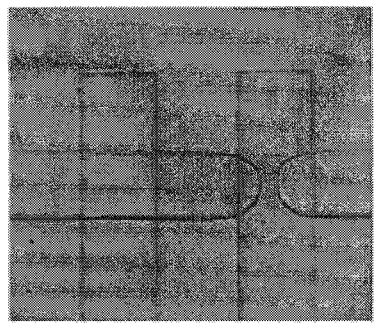
FIGS. 5*a,b* are images of a fabricated microfluidic device in semipermanently closed, and re-opened states.

FIGS. 5a,b are micrograph images of a transparent flexible microfluidic tristate valve in accordance with an embodiment of the invention. The tristate valve is shown respectively in semi-permanently closed and re-opened states. The TPE film is 100 µm membrane is 40 µm thick and 150 µm wide. The substrate is smooth, unpatterened PCO material, and the film was bonded to the substrate under ambient pressure for a period of 24 hours in order to produce a water-tight seal.

Figure 5B:
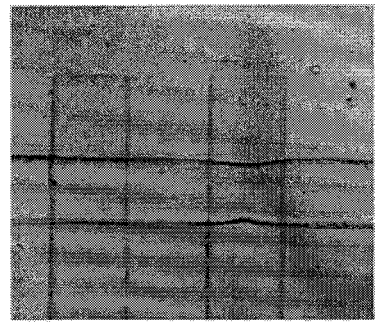

A sustained pressure of 25 psi was applied to the membrane by a home-made pneumatic interface connected to the control channel, for 8 hours to produce a semi-permanently closed valve, as shown in FIG. 5a. Re-opening of the valve was performed by heating the valve to 100° C. for 3 min in an oven, and the reopened tristate valve is shown in FIG. 5b. Repeated opening and semi-permanent closing of this tristate valve has been demonstrated, at least 4 times on the same microfluidic device. After 2-4 days semi-permanently closed, the tristate valve opened within 3 minutes. Given that the semi-permanently closed valve remained closed for the 2-4 days, it is concluded that surface bonds between the membrane and channel wall retained the valve in the closed state, and that this would persist indefinitely.

Depending on the ability of the membrane to reorganize while in the semi-permanently closed state, the semi-permanently closed valve may actually become a permanently closed valve after a given duration. There are competing requirements for the material deformation and bonding properties that have to be in balance in order to permit the valve to reopen reliably and easily, while ensuring that the bonding is stable until thermomechanical stimulus is encountered.

In some cases TPEs exhibit a soft block/hard block structure that permits an intuitive, if simplified, picture of how these membranes work. Hard blocks have a structure that provides support for the bulk properties, and provide substantial elasticity to the TPE while the soft blocks exhibit viscous flow, permeating the hard blocks. The hard blocks will need to retain their initial shape during the sustained deformation of the material (while in the semi-permanently closed state) and retain the elastic deformation to provide impetus to restore the polymer membrane to its initial undeformed state. The soft blocks are required to flow to meet the channel walls and are preferably chosen to interdissolve polymer chains with the materials of the channel walls, to form the bond. The stronger the bond, the better the surface bond. The stronger the elastic force stored by the hard blocks, the greater the restorative force.

While these semi-permanent closing and re-opening procedures worked, Applicant did not attempt to optimize them. It is believed that without modifying the valve lower durations and/or pressures can be used to semi-permanently close and different heating or thermomechanical regimes can be used for reopening. Even small changes in the amount of tackifier, or other surface bonding properties, may permit semi-permanent bonding at lower pressures/time, and reopening at lower temperatures/time. Mechanically assisted reopening, and heat assisted semi-permanent closure are also possible. It is believed that semi-permanent closure at an elevated pressure sustained over less than 3 hours, more preferably less than 1 hour, more preferably less than 30 minutes, more preferably less than 10 minutes or even 3 minutes can be accomplished, that the contact bonds can remain for more than 6 months without substantial thermomechanical stimulus. Applicant has not determined a time limit for permanent closure for the materials provided.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A microfluidic device comprising:
    a thermoplastic elastomer (TPE) film having first and second opposite surfaces;
    a substrate forming a seal with the first surface around a periphery of a channel defined between the substrate and TPE film; and
    a part of the TPE film defining a membrane having a first side defining part of the channel, and a second side mechanically actuable to close the channel,
    wherein compositions of the TPE film and the substrate are chosen so that their respective Hildebrandt parameters differ by less than 10 $(J/cm^3)^{1/2}$ to permit the membrane to be contact bonded to a channel wall if subjected to a first temperature and pressure regime, to semipermanently retain the channel closed under no persistent force on the second side of the membrane, until re-opened by heating or a thermomechanical stimulus without any layer of adhesive between the TPE film and substrate.

2. The device of claim 1 wherein the compositions of the TPE film and substrate are chosen to permit the membrane to be pressed into the channel to limit flow across the channel by application of a force applied on the second side to temporarily close the channel for the duration of the force without semipermanently closing the channel.

3. The device of claim 1:
    wherein the channel opposite the membrane is stiffer than the TPE material;
    wherein the channel is a closed chamber divided by the membrane when the channel is closed;
    further comprising an actuator for selectively applying pressure on the second side of the membrane to close the channel;
    further comprising an actuator for selectively applying pressure on the second side of the membrane to close the channel, the actuator including a conduit formed, at least in part, at an interface between the second surface, and another layer of the microfluidic device;
    wherein the substrate has a through bore opposite the first side of the membrane that is blocked by actuation of the valve; or
    wherein the compositions of the TPE film and substrate are chosen so that their respective Hildebrandt parameters differ by less than 5 $(J/cm^3)^{1/2}$.

4. The device of claim 1 wherein the composition of the TPE film is a formulation containing:
    a thermoplastic rubber, a styrenic block polymer, a copolyester, a polyurethane, a polyolefin blend, a polyolefin alloy, a polyamide, an olefin vinyl polymer, an ethylene vinyl alcohol, or a derivative of one or more of the above;
    a natural rubber, an EVA, a SBR, a SIS, a SBS, an acrylates, or a derivative of one or more of the above
    a SIS, a SEBS, or a derivative of one or more of the above; or
    hydrogenated block copolymers such as SIS, SEBS and SEPS or a polyolefin.

5. The device of claim 1 further comprising a pressurized flow control channel separated from the channel only by the membrane.

6. The device of claim 1 wherein the substrate is formed of a rigid thermoplastic.

7. The device of claim 6, wherein the rigid thermoplastic comprises poly(methyl-methacrylate), poly(cyclo-olefin), polycarbonate, or polystyrene.

8. The device of claim 1 wherein the thermoplastic elastomer comprises SIBS.

9. The device of claim 1 wherein the substrate is harder than the TPE film.

10. The device of claim 1 further comprising:
two pressurized flow control channels at opposite sides of the channel proximal the valve;
a pressurized flow control channel separated from the channel only by the membrane for selectively closing the channel, the membrane being parallel to the substrate; or
a pressurized flow control channel separated from the channel only by the membrane for selectively closing the channel, the membrane being perpendicular to the substrate.

11. The device of claim 1 further comprising an actuator for selectively applying pressure on the second side of the membrane to close the channel, the actuator including a conduit formed, at least in part, at an interface between the second surface, and another layer of the microfluidic device.

12. : A method for semipermanently closing a channel in a microfluidic device, the channel defined at an interface between a substrate and a TPE film, the TPE film chosen so that their respective Hildebrandt parameters differ by less than 10 $(J/cm^3)^{1/2}$ to provide surface bonding to itself and the substrate without any layer of adhesive between the interface, the method comprising: applying pressure to a wall of the TPE film adjacent to the channel to deflect the wall of the TPE film closing the channel, and maintaining this pressure for a prescribed duration, until the surface bond is formed to semipermanently close the channel.

13. A microfluidic device comprising:
a thermoplastic elastomer (TPE) film having first and second opposite surfaces;
a substrate forming a seal with the first surface around a periphery of a channel defined between the substrate and TPE film;
a part of the TPE film defining a membrane having a first side defining part of the channel, and a second side mechanically actuable to close the channel; and
a pressurized flow control channel for selectively closing the channel, the pressurized flow control channel being separated from the channel only by the membrane,
wherein compositions of the TPE film and the substrate are chosen to permit the membrane to be contact bonded to a channel wall if subjected to a first temperature and pressure regime, to semipermanently retain the channel closed under no persistent force on the second side of the membrane, until re-opened by heating or a thermomechanical stimulus.

14. The device of claim 13 wherein the substrate is harder than the TPE film.

15. The device of claim 13 wherein the compositions of the TPE film and substrate are chosen to permit the membrane to be pressed into the channel to limit flow across the channel by application of a force applied on the second side to temporarily close the channel for the duration of the force without semipermanently closing the channel.

16. The device of claim 13
wherein the channel opposite the membrane is stiffer than the TPE material;
wherein the channel is a closed chamber divided by the membrane when the channel is closed;
further comprising an actuator for selectively applying pressure on the second side of the membrane to close the channel;
further comprising an actuator for selectively applying pressure on the second side of the membrane to close the channel, the actuator including a conduit formed, at least in part, at an interface between the second surface, and another layer of the microfluidic device;
wherein the substrate has a through bore opposite the first side of the membrane that is blocked by actuation of the valve;
wherein the compositions of the TPE film and substrate are chosen so that their respective Hildebrandt parameters differ by less than 10 (J/cm3)1/2;
wherein the compositions of the TPE film and substrate are chosen so that their respective Hildebrandt parameters differ by less than 5 $(J/cm^3)^{1/2}$; or
further comprising a second pressurized flow control channel at an opposite side of the channel proximal the valve.

17. The device of claim 13 wherein the membrane between the pressurized flow control channel and the channel is: parallel to the substrate or perpendicular to the substrate.

18. The device of claim 13 wherein the substrate is formed of a rigid thermoplastic composed of one of: poly(methylmethacrylate), poly(cyclo-olefin), polycarbonate, and polystyrene.

19. The device of claim 13 wherein the composition of the TPE film is a formulation containing:
a thermoplastic rubber, a styrenic block polymer, a copolyester, a polyurethane, a polyolefin blend, a polyolefin alloy, a polyamide, an olefin vinyl polymer, an ethylene vinyl alcohol, or a derivative of one or more of the above;
a natural rubber, an EVA, a SBR, a SIS, a SBS, an acrylates, or a derivative of one or more of the above;
a SIS, a SEBS, or a derivative of one or more of the above; or
hydrogenated block copolymers such as SIS, SEBS and SEPS or a polyolefin.

20. The device of claim 13 wherein the thermoplastic elastomer comprises oil-free SEBS.

* * * * *